(12) United States Patent
Lewis et al.

(10) Patent No.: US 9,756,094 B1
(45) Date of Patent: Sep. 5, 2017

(54) DETERMINING A REFERRAL SOURCE BY A MOBILE APPLICATION OR OPERATING SYSTEM

(71) Applicant: Google Inc., Mountain View, CA (US)

(72) Inventors: Justin Lewis, Marina del Rey, CA (US); Ruxandra Georgiana Paun, Santa Monica, CA (US)

(73) Assignee: Google Inc., Mountain View, CA (US)

( * ) Notice: Subject to any disclaimer, the term of this patent is extended or adjusted under 35 U.S.C. 154(b) by 370 days.

(21) Appl. No.: 14/299,588

(22) Filed: Jun. 9, 2014

(51) Int. Cl.
*G06F 15/16* (2006.01)
*H04L 29/06* (2006.01)

(52) U.S. Cl.
CPC .................................. *H04L 65/403* (2013.01)

(58) Field of Classification Search
CPC ...................................................... H04L 65/403
USPC ........................................................ 709/204
See application file for complete search history.

(56) References Cited

U.S. PATENT DOCUMENTS

| | | | | |
|---|---|---|---|---|
| 6,122,572 A * | 9/2000 | Yavnai | ................. | G05D 1/0088 342/13 |
| 7,949,563 B2 * | 5/2011 | Collins | .............. | G06Q 10/0631 705/14.42 |
| 9,077,565 B2 * | 7/2015 | Agrawal | ............... | H04L 12/585 |
| 2008/0086454 A1 * | 4/2008 | Bahadori | ............ | G06F 17/3089 |
| 2008/0177600 A1 * | 7/2008 | McCarthy | .......... | G06Q 10/0639 705/7.33 |
| 2010/0064040 A1 * | 3/2010 | Wise | ...................... | G06Q 30/02 709/224 |
| 2010/0318611 A1 * | 12/2010 | Curtin | ..................... | G06F 17/30 709/206 |
| 2012/0330701 A1 * | 12/2012 | Hyder | .................... | G06Q 10/00 705/7.11 |
| 2013/0006980 A1 * | 1/2013 | Frumin | ............. | G06F 17/30575 707/736 |
| 2013/0054483 A1 * | 2/2013 | Ali | ..................... | G06Q 10/1053 705/321 |
| 2013/0318180 A1 * | 11/2013 | Amin | .................... | H04L 65/403 709/206 |

* cited by examiner

*Primary Examiner* — Joseph Greene
(74) *Attorney, Agent, or Firm* — Byrne Poh LLP

(57) ABSTRACT

Systems and methods are provided for associating a tag in a URL to facilitate identifying a source to which the URL was shared. In one or more aspects, a system is provided that includes a request component configured to receive a request to access information provided by a network source associated with the system, the request comprising a uniform resource locator (URL) for the information. The system further includes a rendering component configured to provide the information in response to the request, and a source component configured to identify a source to which the URL was previously shared to based on identification of a tag included in the URL.

16 Claims, 10 Drawing Sheets

DETERMINING A REFERRAL SOURCE BY A MOBILE APPLICATION OR OPERATING SYSTEM

TECHNICAL FIELD

This application generally relates to systems and methods for determining a referral source by a mobile application or operating system.

BACKGROUND

Users often share links to content items (e.g., pictures, videos, songs, articles, etc.) provided by a networked content provider with others via online social networking communities, messaging applications, blogs, and other networked sources. Knowing the source (referred to herein as the "referral source") from which a user was directed to a content provider's source based on selection of an inbound hyperlink, located at the source, to content at the content provider's source, can be useful to the content provider. For instance, by knowing the referral source, the content provider may recommend other content items to the user that are popular amongst users of the referral source. Although some browsers have the ability to detect a referral website, mobile applications and operating systems do not employ this functionality.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
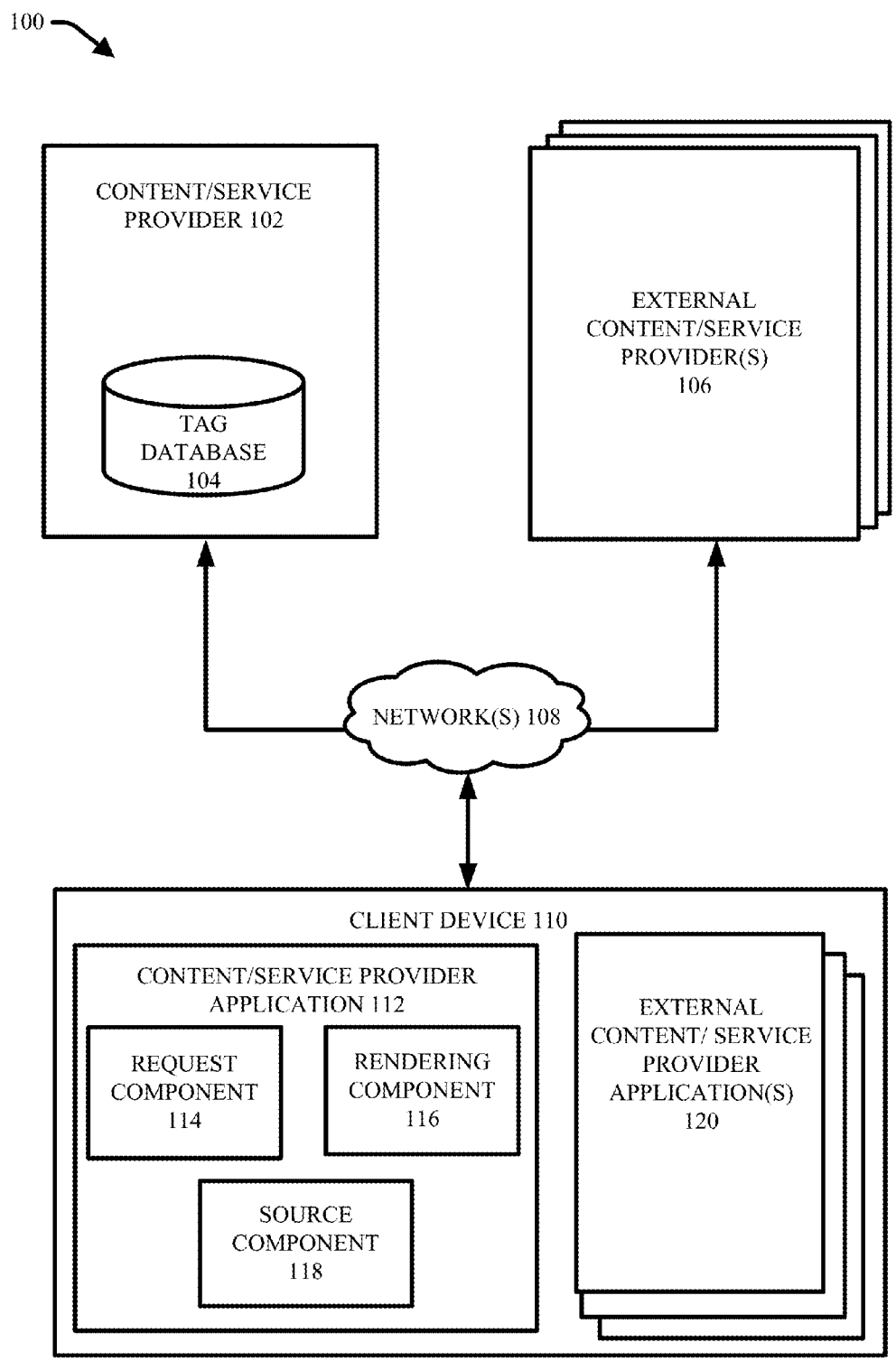
FIG. 1 illustrates an example system for determining a referral source by a mobile application or operating system in accordance with various aspects and embodiments described herein.

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

By way of introduction, the subject matter described in this disclosure relates to a mechanism for determining or inferring a referral source by a mobile application or operating system. Users often share links to content items (e.g., pictures, videos, songs, articles, etc.) provided by a networked content provider with others via online social networking communities, messaging applications, blogs, and other networked sources. For example, a user may find a video provided by a networked video sharing service entitled "MediaWorld" and share a link to the video on his or her social networking profile page at social network entitled "MyFriends." The link can include a uniform resource locator (URL) for the video that identifies the video's network location at MediaWorld. When another user navigating about MyFriends comes across the link and selects the link, the other user will be directed from MyFriends to the network location for the video at MediaWorld (e.g., a web location or mobile application location) to view the video.

Knowing the source, (referred to herein as the referral source), from which a user selected an inbound link to content provided by another source can be useful to the other source. For instance, in furtherance to the above example, if MediaWorld knows that the other user came from MyFriends to view the video in response to selection of an inbound link to the video located at MyFriends, MediaWorld can assume the other user is a fan or at least a user of MyFriends. MediaWorld may then choose to recommend other media items to the other user that are popular amongst other users of MediaWorld.

Use of mobile devices, and particularly mobile applications, to consume and share content is becoming increasingly popular. Mobile application traffic behaves differently than desktop traffic. There is a substantial amount of traffic on mobile application based content/service providers that comes from other mobile application based content/service providers which do not have website counterparts (e.g., via link sharing between the respective mobile applications of the content/service providers). In addition, even where some networked content/service providers have both mobile application and website counterparts, when opening links to content provided by the networked content/service providers while on a mobile device, it is generally more preferable to employ the mobile application platform as opposed to the website platform. Although some browsers have the ability to detect a referral source, mobile applications do not employ this functionality. Accordingly, when a mobile application for a content/service provider opens content in response to selection of an inbound link at an external source (e.g., a webpage or mobile application page of an external content/service provider), the mobile application cannot identify the external source as the referral source.

The subject disclosure provides mechanisms for determining a referral source by a mobile device application or operating system based on navigation to the mobile device application in response to selection of an inbound URL at the referral source for content provided at the mobile application or mobile application service/content provider. The referral source can include any type of network source that can provide inbound links to content provided by the mobile application or mobile application content/service provider. For example, the referral source can include another mobile application or mobile application content/service provider, a website, a webpage or another device. The inbound URL can either be a web URL or an application specific URL (e.g., as seen on iOS).

In an aspect, a tag is included in the outbound URL when it is initially shared from the mobile application, or the content/service provider associated with the mobile application, to an external source. This tag is attributable to the external source to which the outbound URL was initially shared. For example, the tag can include an identifier for the external source or a unique token keyed to an identifier for the external source in a secure database. By including this tag in the outbound URL, later on when the URL is selected using a mobile device, the content represented by the URL can be opened by the mobile device using the mobile application, and the mobile device application can employ the tag to identify the external source. The mobile device application can assume that the URL was not re-shared from the external source to another external source. Accordingly, the mobile device application can assume that the URL was selected at the external source and characterize the external source as the referral source (e.g., the source that that directed the user to the mobile application).

Once the referral source is identified there are several key uses for it. In an aspect, this information is used by the mobile application to identify which other applications and services the user is a regular user of. These applications and services can then be suggested to the user for sharing other information provided by the mobile application.

In one or more aspects, a system is provided that includes a request component configured to receive a request to access information provided by a network source associated with the system, the request comprising a uniform resource locator (URL) for the information. The system further includes a rendering component configured to provide the information in response to the request, and a source component configured to identify a source to which the URL was previously shared to based on identification of a tag included in the URL.

In another aspect, a method is disclosed that includes receiving a request to access information provided by a network source, the request comprising a uniform resource locator (URL) for the information, providing the information in response to the request, and identifying a source to which the URL was originally shared to from the network source based on identification of a tag included in the URL.

Further provided is a system that includes a sharing component configured to receive a request to share data provided by the system at another source, and a link generation component configured to generate a uniform resource locator (URL) for the data at the system in response to the request, the URL comprising a tag for identifying the other source. The system further includes a source component configured to associate the URL and the tag with an identifier for the other source in a look-up table, and a posting component configured to send the URL to the other source for inclusion at the other source.

Referring now to the drawings, with reference initially to FIG. 1, presented is a diagram of an example system 100 for determining a referral source by a mobile application or operating system in accordance with various aspects and embodiments described herein. Aspects of systems, apparatuses or processes explained in this disclosure can constitute machine-executable components embodied within machine (s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

System 100 includes a content/service provider 102, one or more external content/service providers 106, and client device 110. System 100 also includes one or more networks 108 for connecting content/service provider 102, external content/service provider 106 and/or client device 110. Generally, content/service provider 102, external content/service providers 106, and client device 110 can include memory that stores computer executable components and a processor that executes the computer executable components stored in the memory, examples of which can be found with reference to FIG. 9.

Content/service provider 102 and external content/service providers 106 can include entities or network sources that provide content and/or services, accessible to client device 110 via a network 108, using a network based platform. The network based platform can include a website and/or a mobile application. Where the network based platform is a website, client device 110 can include and employ a browser to access the network based platform to receive the service and access the content provided by the content/service provider. Where the networked based platform is a mobile application, client device 110 can include a resident application for the content/service provider (e.g., stored/provided at client device 110) configured to interact with the content/service provider to receive the service and/or access the content provided thereby. The resident application (e.g., applications 112 and 120) can include native applications and/or hybrid applications. According to this aspect, the content/service provider can embody or employ a mobile application service provider. For example, client device 110 can include a content/service provider application 112 configured to interact with content/service provider 102 to receive a service and/or access content provided by the content/service provider 102 via a network 108. Client device 110 can also include external content/service provider applications 120 configured to interact with their respective external content/service providers 106 to receive a service and/or access content provided by their respective content/service providers 106 via a network 108.

For example, content/service provider 102 and/or an external content service provider 106 can include a system that provides streaming media content and services to client device 110 via a website accessible to client device 110 via a browser. In an aspect, the streaming media provider can solely employ a website platform. In another aspect, in addition to the website platform, the streaming media provider can also employ a mobile application service provider counterpart that provides streaming media content and services to the client 110 via a native mobile application 112 or 120 provided at client device 110. In another example, content/service provider 102 and/or an external content service provider 106 can include a messaging application service provider that provides messaging services to client device 110 via a native mobile application 112 or 120 provided at the client device 110. According to this example, the messaging application service provider may only employ a mobile application platform with no website counterpart.

It should be appreciated that a variety of types of content/service providers employing web based platforms, application based platforms, or both web and application based platforms, are suitable for operation in accordance with aspects of system 100. For example, these content/service providers can include an information source that provides encyclopedic information on a variety of subjects. In example, a content/service provider 102 or 106 can include a picture sharing service that also includes messaging functionality and picture editing tools. In another example, a content service provider 102 or 106 can include an online shopping service, a navigation application, a social networking system, a music recognition service, a gaming service, etc.

Content/service provider 102 can provide content that can be shared at external content/service providers 106 using a shared URL. When functioning in this role, the external content/service providers 106 are considered sharing sources (e.g., sources where content is shared to). External content/service providers 106 can receive and provide the shared URL where it functions as an inbound URL to the content at the content/service provider 102. When a shared URL located at a content/service provider 106 to content provided by content/service provider 102 is selected at client device 110, the URL will direct the client device to a network platform (e.g., website or application) employed by content/service provider 102 to open the content represented by the URL. When functioning in this role, the external content/service provider is considered the referral source. An external content/service provider 106 is referred to as an "external" source merely to indicate that it is entity separate or remote from content/service provider 102. To facilitate description of the various aspects of system 100, content/service provider 102 is described as a source that facilitates generating and/or sharing an outbound URL to content provided by content/service provider 102 and content/service providers 106 are described as sources that facilitate receiving and providing the shared as an inbound URL.

In an exemplary embodiment, content/service provider 102 includes a streaming media provider configured to provide streaming media (e.g., video, live video, animations, audio, music etc.) to users at their respective client devices 110 via a network 108. The streaming media can be accessed by the respective users via their respective client devices at a either a website platform or a mobile application platform (e.g., content service provider application 112) employed by the streaming media provider. For example, the streaming media provider 102 can include an Internet based media sharing service configured to allow users to upload and share media content. The streaming media provider can have access to a voluminous quantity (and potentially an inexhaustible number) of shared media (e.g., video and/or audio) files for streaming to client devices 110 on demand and/or in a live manner. The media can be stored in memory associated with the media provider and/or at various servers (e.g., application servers and/or web servers) employed by the media provider.

In an aspect, a user of client device (e.g., client device 110 or another computing device) can access the streaming media provider (e.g., content/service provider 102) using either a website or client device application platform to view media items provided thereby. The user can further request to share a media item provided by the streaming media provider at an external content/service provider 106. For example, the user can request to share a video or song provided by the streaming media provider at a social networking profile, with another user via a messaging application, on a blog, etc. In response to a request to share the media item at an external content/service provider 106, the streaming media provider (and/or client application for the streaming media provider) can generate and send an outbound URL to the media item for posting at the external content/service provider 106. This URL will have unique parameter included therein that can later be employed by a rendering mobile application or device (e.g., application 112 and/or client device 110) to identify the external content/service provider 106.

The term media content or media item can include but is not limited to streamable media (e.g., video, live video, video advertisements, animations, music, music videos, sound files and etc.) and static media (e.g., pictures, thumbnails). The term media content or media item includes a collection of media items such as a playlist including several videos or songs, or a channel including several videos or songs associated with a single media creator or curator. A channel can include data content available from a common source or data content having a common topic or theme. A channel can be associated with a curator who can perform management actions on the channel. Management actions may include, for example, adding media items to the channel, removing media items from the channel, defining subscription requirements for the channel, defining presentation attributes for channel content, defining access attributes for channel content, etc. The channel content can be digital content uploaded to the internet-based content platform by a channel curator and/or digital content selected by a channel curator from the content available on the Internet-based content platform. A channel curator can be a professional content provider (e.g., a professional content creator, a professional content distributor, a content rental service, a television (TV) service, etc.) or an amateur individual. Channel content can include professional content (e.g., movie clips, TV clips, music videos, educational videos) and/or amateur content (e.g., video blogging, short original videos, etc.). Users, other than the curator of the channel, can subscribe to one or more channels in which they are interested.

Client device 110 can include any suitable computing device associated with a user and configured to interact with content/service provider 102. For example, client device 110 can include a mobile phone, a smartphone, a tablet personal computer (PC), a wearable device, or a personal digital assistant PDA. Client device 110 can also include other computing devices such as a desktop computer, a laptop computer, a television, or an Internet enabled television. As used in this disclosure, the terms "content consumer," "user," or "participant" refers to a person, entity, system, or combination thereof that employs system 100 (or additional systems described in this disclosure) using a client device 110. Networks 108 can include wired and wireless networks, including but not limited to, a cellular network, a wide area network (WAD, e.g., the Internet), a local area network (LAN), or a personal area network (PAN). For example, a client device 110 can communicate with content/service provider 102, external content service providers 106 and/or another client device (and vice versa) using virtually any desired wired or wireless technology, including, for example, cellular, WAN, wireless fidelity (Wi-Fi), Wi-Max, WLAN, and etc. In an aspect, one or more components of system 100 are configured to interact via disparate networks.

In an exemplary embodiment, client device 110 includes content/service provider application 112. Client device 110 can employ content/service provider to interact with content/service provider 102 via a network 108. In particular content/service provider application 112 and content/service provider 102 operate in a server client relationships wherein content/service provider application 112 can receive and provide at least some form or content and/or service in association with access to content or services provided by content service/provider 102 via a network 108. For example, where content/service provider 102 is a streaming media provider, content/service provider application 102 can access content/service provider to view media items provided thereby. In an aspect, content/service provider 102 can also employ a website platform and client device 110 may alternatively access content service provider 102 via the web site platform using a browser (however this is generally not preferred).

Client device 110 can also access an external content/service provider 106 using either a client application 120 for the external/content service provider or at a website platform employed by the external/content service provider using a browser. As discussed above, external content/service provider(s) can provide inbound URLs to content provided by content/service provider 102. These inbound URLs can be configured to navigate a device to either to a webpage platform of content/service provider 102 (e.g., a web URL) where the content is located or a page of a native content/service provider application 112 where the content is located (e.g., application URL). For example, where content/service provider 102 employs both a website platform and a mobile application platform, links to content provided by content/service provider 102 can include URLs that identify a website location of the content and/or a mobile application location of the content.

In an aspect, regardless as to whether the inbound URL is a web URL or an application URL, client device 110 is particularly configured to open the inbound URL using content/service provider application 112. Content/service provider application 112 can include request component 114, rendering component 116 and source component to facilitate opening content represented by an inbound URL in response to selection, on the client device 110, of the inbound URL at an external source, providing the content represented by the inbound URL, and determining the identity external source.

Request component 114 is configured to receive a request to open a link or URL to information provided by content/service provider 102. In particular, request component 114 can receive a request to access information provided by content/service provider 102 and accessible to client device 110 via a client side content/service provider application 112 (e.g., content/service provider 102 includes an application service provider (ASP)). For example, content/service provider 102 can include a video streaming service configured to provide streaming media to users via a network 108. Users can interface with the streaming video service to access content provided the video streaming service by using a client side application (content/service provider application 112) located at their respective client devices.

The request received by request component 114 is responsive to selection of the link or URL by client device (or a user of client device) at an external source. In an aspect, the external source can include an external content/service provider's 106 application page rendered via the external content/service provider's client application 120 located at client device 110. According to this example, a user of client device 110 can open an external content/service provider application 120 to access the URL. For instance, the application 120 can include a social networking application that includes the URL on a friends social network profile page accessed by interfacing with the application's external content/service provider 106. In another example, the application 120 can include a messaging client that includes the URL in a received message accessed via the messaging client. In another aspect, the external source can include an external content/service provider's 106 website or webpage. According to this example, a user of client device 110 can access the website or webpage to view and select the link or URL using a browser provided at client device 110.

In an aspect, client device 110 intercepts request to open an inbound link and directs content/service provider application 112 to service the request (e.g., as opposed to a browser of the device or an external content/service provider application 120) based on the URL and/or information associated with the URL. In an aspect, the link or URL associated with the request is an application specific URL (specific for content/service provider application 112). According to this aspect, the URL will include information that directs client device 110 to open the link using content/service provider application 112. In another aspect, content service provider 102 can also be configured to provide content to client devices via a website platform that can be accessed by the client devices using a browser. According to this aspect, a link or URL associated with the request can include a web URL that identifies a website location for the content at the content/service provider 102. When the link or URL is a web URL, the link or URL can be associated with information that directs client device to open the content represented by the web URL using the content/service provider application 112 as opposed to a browser.

For example, on most mobile operating systems web URLs can be intercepted and re-navigated to a native application where the native application counterpart is provided on the device. In some applications, web URLs are wrapped by one or more redirection services. The redirection service can either be a webpage, a native mechanism of the mobile device operating system, or a native application. In some cases the mobile device can fetch the content at the web URL and an extract an alternative application URL for the content from the webpage represented by the web URL, where available. For example, metadata can be included in the webpage content represented by the web URL that lists several alternative native application URLs for the content (e.g. where each of the native application URLs are configured for opening based on the operating system of the rendering device). Where the device has the native client application, the device can fetch the webpage using the web URL and scrape the metadata to find and extract the appropriate native application URL that is configured for the device. The device can then direct request component 114 to open the native application URL.

The URL or link requested for opening by content/service provider application 112 (or selected for opening from metadata associated with a web URL), includes an extra parameter or tag that facilitates identifying the referral source. In particular, a URL is a specific character string the constitutes a reference to a resource. It generally includes information identifying a scheme name or access protocol, a host name (e.g., a domain name), and the full path to the resource. In an aspect, the URL or link includes an identifier that identifies the external source to which the URL was shared to as an outbound link from content/service provider 102. According to this aspect, the identifier can include text provided in the portion of the URL that includes the path to the resource and can identify the host or domain name of the source to which the URL was originally shared. For example, where the URL was originally shared from content/service provider 102 to a social network profile at a social networking source, the URL can include an identifier that identifies the social networking source. In another example, where the URL was originally shared from content/service provider 102 to another user using a messaging application, the URL can include an identifier for the messaging application.

In another aspect, this extra parameter or tag is a unique token that identifies the source to which the URL was originally to shared to from content/service provider 102. According to this aspect, when the outbound URL is generated in response to a request to share the content represented by the URL, a unique or random token is also generated and attached to or included in the URL. For example, the unique token can be provided in the portion of the URL that includes the path to the resource. According to this aspect, the unique token will not include text that identifies and the host or domain name of the source to which the URL was originally shared. On the contrary, this unique token is keyed in a database controlled by content/service provider 102 to an identifier for the source to which the outbound URL was shared. For example, content/service provider 102 can include a tag database 104 that includes information associating tokens with source identifiers. In an aspect, the URL, the token, and the source identifier are all associated with one another in the tag database. According to this aspect, the unique token will only work to identify the source when associated with the original URL (e.g., the token cannot be removed and attached to another URL).

Rendering component 116 is configured to launch the application page represented by the URL associated with the request to render the content represented by the URL. For example, where the inbound link associated with the request is for a video provided by content/service provider 102, rendering component 116 can open the video at the content/service provider application 112 location. In an aspect, where the URL includes a unique token that facilitates identifying the source to which the URL was originally shared, rendering component 116 can remove this token from the URL in association with opening the content represented by the URL at content/service provider application 112 (e.g., rendering component can redirect the page so that it does not include the unique identifier). As a result, if and when the URL is shared from content/service provider application 112 to another external source, the shared URL will either have a fresh unique identifier or none at all, as described in more detail with respect to FIG. 2.

Source component 118 is configured to identify the external source to which the URL was originally shared to using the tag associated therewith. In particular, where the tag is an identifier for external source, source component 118 can extract the identifier from the URL to determine the external source. In another aspect, where the tag is a unique token, source component 118 can identify and extract the token. Source component 118 can further access and employ the tag database 104 at content/service provider 102, to look-up and identify the external source associated with the tag. Content/service provider application 112 can then consider (assuming that the URL was not re-shared to another source) that the external source to which the URL was originally shared is the referral source. In an aspect, where both the token and the URL do not match the token and the URL in the tag database, source component 118 will not identify the external source associated with the token in the tag database as the source to which the URL was originally shared.

Figure 2:
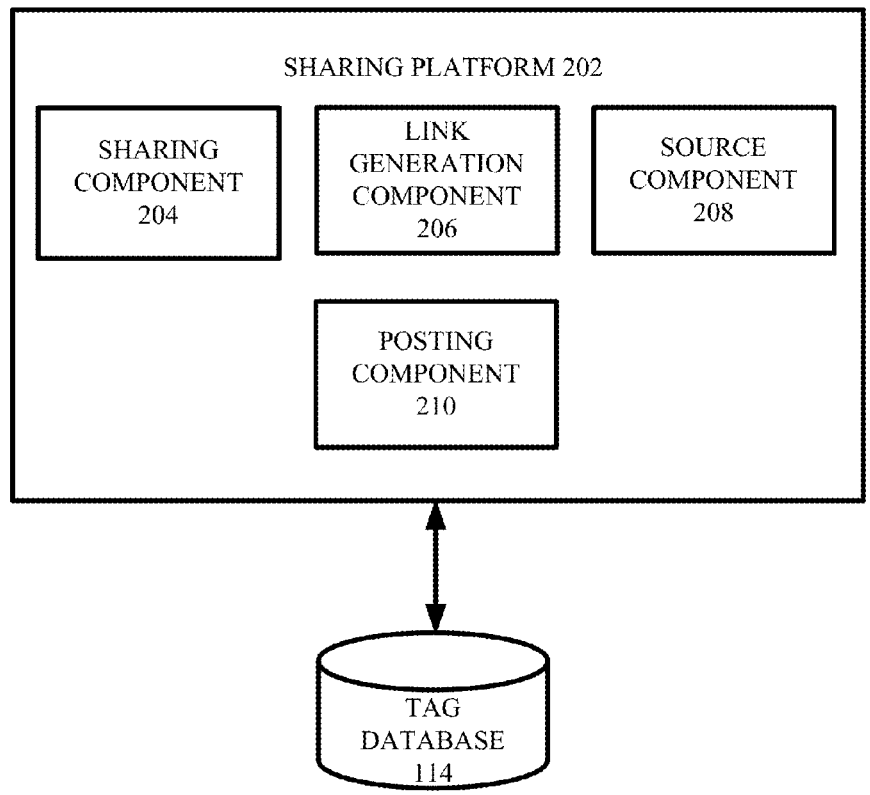
FIG. 2 illustrates an example sharing platform configured to generate and share a URL with a tag that facilitates identifying a source to which the URL was shared in accordance with various aspects and embodiments described herein.

Referring now to FIG. 2, presented is diagram of an example sharing platform 202 configured to generate and share a URL with a tag that facilitates identifying a source to which the URL was shared in accordance with various aspects and embodiments described herein. Sharing platform is configured to be employed in association with system 100 and the like. In an aspect, sharing platform 202 is included in or provided at content/service provider application 112 located at client device 110. In another embodiment, sharing platform 202 is included in or provided at content/service provider 102. Still in other aspects, one or more components of sharing platform 202 are provided at content/service provider 102, and one or more components of sharing platform 202 are provided at content/service provider application 112. Repetitive description of like elements employed in respective embodiments of systems and methods described herein is omitted for sake of brevity.

Sharing platform 202 facilitates sharing of content from a first network source to another network source via shared URLs. In particular, sharing platform 202 can facilitate sharing URLs to content provided by content/service provider 102 at an external content/service provider 106. In an aspect, a user can access a content item provided by content/service provider 102 via client side content/service provider application 112 and employ sharing platform 202 to share a URL to the content item at an external content/service provider 106. For example, the user can share a URL to a content item provided by content/service provider 102 on his or her social network profile or with another user or group of users via a messaging service. According to this aspect, sharing platform 202 can be provided at content/service provider application 112, content/service provider 102 (e.g., where content/service provider 102 functions as or employs a mobile ASP), and/or one or more components of sharing platform 202 can be shared between content service provider application 112 and content service provider 102. When a user or client device 110 accesses sharing platform 202 using content/service provider application 112, the outbound or shared URL generated by sharing platform 202 can include an application specific URL.

In another aspect, a user can access a content item provided by content/service provider 102 via a website platform employed by content/service provider 102 using a browser of client device 110 and employ sharing platform 202 to share a URL to the content item at an external content/service provider 106. According to this aspect, sharing platform 202 is provided at content service provider 102 and accessed via a website platform of content/service provider 102 using a browser. Where sharing platform 202 facilitates sharing content accessed via a website platform of content/service provider 102, the outbound or shared URL generated by sharing platform 202 can include a web URL (e.g., pointing to the webpage location of the content). However, in association with generation of the web URL, sharing platform 202 is also configured to embed metadata in the webpage represented by the web URL. This metadata can include one or more corresponding application specific URLs for the content that instruct a content/service provider application 112 where/how to access the content.

Sharing platform 202 can include sharing component 204, link generation component 206, source component 208 and posting component 210. Sharing component 202 is configured to receive a request from client device 110 (or a user of client device 110) to share a content item provided by content/service provider 102 at an external content/service provider 106. The request includes information identifying the external content/service provider 106 to which the user would like to share the content item. For example, where content/service provider 102 is a video sharing service, a user can request to share a video provided thereby with another user via a messaging application or on his or her social network profile page. In association with making the request, the user can select the external content/service provider 106.

Link generation component 206 is configured to generate an outbound URL to the content item requested for sharing. In an aspect, where the content item and sharing platform is accessed via client side content/service provider application 112, the outbound URL can include an application specific URL for the content item. In another aspect, where the content item and sharing platform 202 is accessed via a website platform of content/service provider 102, the outbound URL can include an web URL for the content item. In association with generation of an application specific URL for the content item or a web URL for the content item, link generation component 206 is configured to generate a tag that identifies the external content/service provider 106 to which the user requested to share the content item (e.g., the external source to which the outbound URL is requested to be shared). Link generation component 206 further embeds the tag (or includes the tag) in the URL.

In an aspect, the tag is an identifier for the external source. For example, where the user requested to share the content item with his or her friend using a group messaging service "GroupMyFriends," the identifier can include text or code that identifies "GroupMyFriends." In another aspect, the tag can include a unique token. For example, link generation component 206 can generate a unique token and embed the token in the URL for the content item. According to this aspect, source component 208 is configured to associate the unique token with an identifier for the external source to which the content item represented by the URL is requested for sharing to in tag database 114. In an aspect, source component 208 is configured to associate the token, the identifier for the external source, and the URL with one another in the tag database 114. Tag database 114 is depicted separate from sharing platform 202 in FIG. 2 merely to indicate that it can be included with sharing platform 102 (e.g., at content/service provider 102 or content/service provider application 102) or remote from sharing platform 202 and accessible to content/sharing platform 202 via a network. For example, one or more component of sharing platform 202 can be provided at content/service provider application 112 and tag database 114 can be provided at content/service provider 114.

In an aspect, where link generation component 206 generates a web URL, in the alternative to or in addition to embedding/including the tag in the web URL, link generation component 206 can embed or include the tag in metadata for the webpage represented by the web URL. For example, link generation component 206 can generate one or more application specific URLs that instruct content/service provider application 112 how (depending on the rendering device operating system) and where to access the content item as provided by a mobile ASP employed by the content/service provider 102. According to this example, link generation component 206 can include the tag in the application specific URLs embedded in the metadata for the webpage represented by the web URL. As a result, when client device 110 receives a request to open the web URL, the client device can identify the appropriate application specific URL in the metadata and open the application specific URL using content/service provider application 112 (as opposed to the web URL). The content/service provider application 112 can then employ the tag included in the application specific URL to identify the source to which the web URL was originally shared.

Posting component 210 is configured to send or post an outbound URL (e.g., having a tag appended thereto by link generation component 206) to the external content/service provider 106 source which the content item represented by the URL is requested for sharing to from content/service provider 102. For example, posting component 210 can send a URL for a content item, provided by content provider 102, to an external source (e.g., to a social networking profile, blog, a webpage, an application page, etc.) for posting at the external source in response to a request to share the content item from content/service provider 102 to the external source. In another example, posting component 210 can send a URL to a content item provided by content/service provider 102, to a messaging application service provider for inclusion in a message selected for sending to another user or group of users.

In an aspect, where sharing platform is 202 is included with content/service provider application 112 and/or accessed at content/service provider 102 via content/service provider application 112, sharing platform 202 can potentially receive a request to share a content item rendered by content/service provider application 112 in response to a request to open an inbound URL having a tag included therein, wherein the tag is attributable to the external source to which the URL was originally shared. For example, first user can employ a first client device having a content/service provider application 112 and sharing platform 202 provided thereon to access content provided by content/service provider 102 and share a URL to a content item provided by content/service provider 102 at an external content/service provider 106 using sharing platform. As described above, the shared URL will include a tag appended thereto generated by link generation component 206 that identifies the external content/service provider 106 to which the URL was shared. Later, a second user can employ a second device having a content/service provider application 112 and sharing platform provided thereon. The second user can access the external content/service provider 106 to view and select the URL. In response to selection of the URL, the content/service provider application 112 of the second device can open the URL and identify the external content/service provider 106 using the tag appended thereto. The second user can further request to share the content item represented by the opened inbound URL at another external content/service provider 106.

According to this aspect, when sharing platform 202 receives a request to share a content item represented by a URL that was previously associated with a tag attributable to an external source to which it was originally shared, link generation component 206 can either generate a new tag attributable to the new source to which it has been requested for sharing or share the URL without a tag appended thereto that identifies the new source. In an aspect, the previous tag is removed from the URL by rendering component 116 in association with opening the inbound URL.

Figure 3:
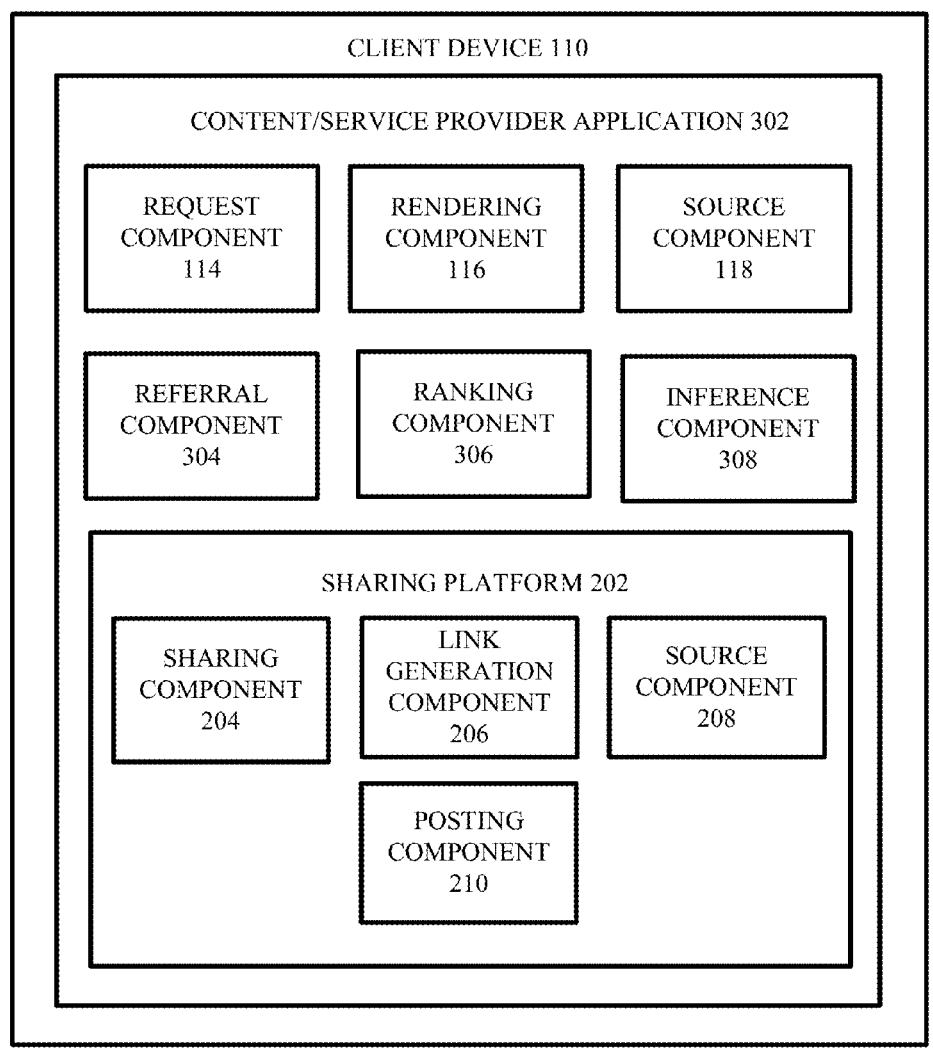
FIG. 3 illustrates an example client device that includes a native application that facilitates determining a referral source in accordance with various aspects and embodiments described herein.

FIG. 3 presents another example content/service provider application 302 for employment in client device 110 in association with system 100 in accordance with various aspects and embodiments described herein. Content/server provider application 302 is similar to content/service provider application 112 with the addition of referral component 304, ranking component 306 and inference component 3082. For exemplary purposes, content/service provider application 302 is also depicted with inclusion of sharing platform 202. Repetitive description of like elements employed in respective embodiments of systems and methods described herein is omitted for sake of brevity.

Referral component 304 is configured to determine or infer a referral source from which a request is received, by request component 114, to open a content item represented by an inbound URL. The content represented by the inbound URL is located at content service provider 102 and accessed by content/service provider application 302 in response to the request. In particular, as previously described, source component 118 is configured to identify the external source to which the URL was originally shared to from content/service provider 102 using the tag included in the URL. Referral component 304 then assumes and characterizes the external source to which the URL was originally shared to from content/service provider 102 as the referral source. Referral component 304 can further track which external sources are characterized as referral sources and associated these referral sources with client device 110 or a particular user of content service/provider application 302 over time. In an aspect, referral component 302 can communicate with the ASP (content/service provider 102) for content/service provider application 302 to relay information thereto identifying referral sources associated with client device 110 or a user of content/service provider application 302.

Once a referral source is determined there are many uses for it by content/service provider application 302 and/or its ASP content/service provider 102 depending on the type of content and services provided by the content/service provider application 302. For example, where content/service provider 102 is a streaming media service provider, the streaming media provider and/or its associated content/service provider application 302 can choose to recommend other videos for watching by the user of client device 110 that are affiliated with or popular with other users of the referral source. In another example, in association with sharing content from content/service provider 102 with external content/service providers 106, content/service provider application 302 can recommend those external content/service providers 106 characterized as referral sources as possible sharing sources. For instance, where a referral source is an application for a social network, because the user is coming to the content/service provider application 302 from the social networking application, it can be assumed that he or she is likely to share other videos to that respective social network through the same application he or she came from. Accordingly, sharing component 204 can recommend the social network application as a source to which the user may want to share other content items provided by content/service provider 102 with using shared URLs. For example, in association with a request to share content from content/service provider 102 received by sharing component 204, sharing component 204 can generate a sharing menu that offers a list of possible sharing sources to which the user of content service/provider application 302 may desire to share the content. These possible sharing sources can be selected from a set of known external content/service providers 106.

Ranking component 306 is configured to rank known external/content service providers 106 for inclusion in this sharing menu as possible or suggested sharing sources based in part on characterization as referral sources by referral component 304. In an aspect, ranking component 306 can rank the known external content/service providers 106 based on frequency and recency with which the respective external content/service providers 106 are identified as referral sources by referral component 304. Sharing component 204 can then select a subset of the external content/service providers 106 for inclusion in a sharing menu based in part on their ranking. For example, where a user tends to come from external sources A, B and C on a regular basis, ranking component 306 can rank external sources A, B and C as strong candidates for inclusion in a sharing menu as possible or suggested sharing sources. Sharing component 204 can then include external sources A, B, and C, in a sharing menu in response to a request to share content from content/service provider 102 to an external source.

Figure 4:
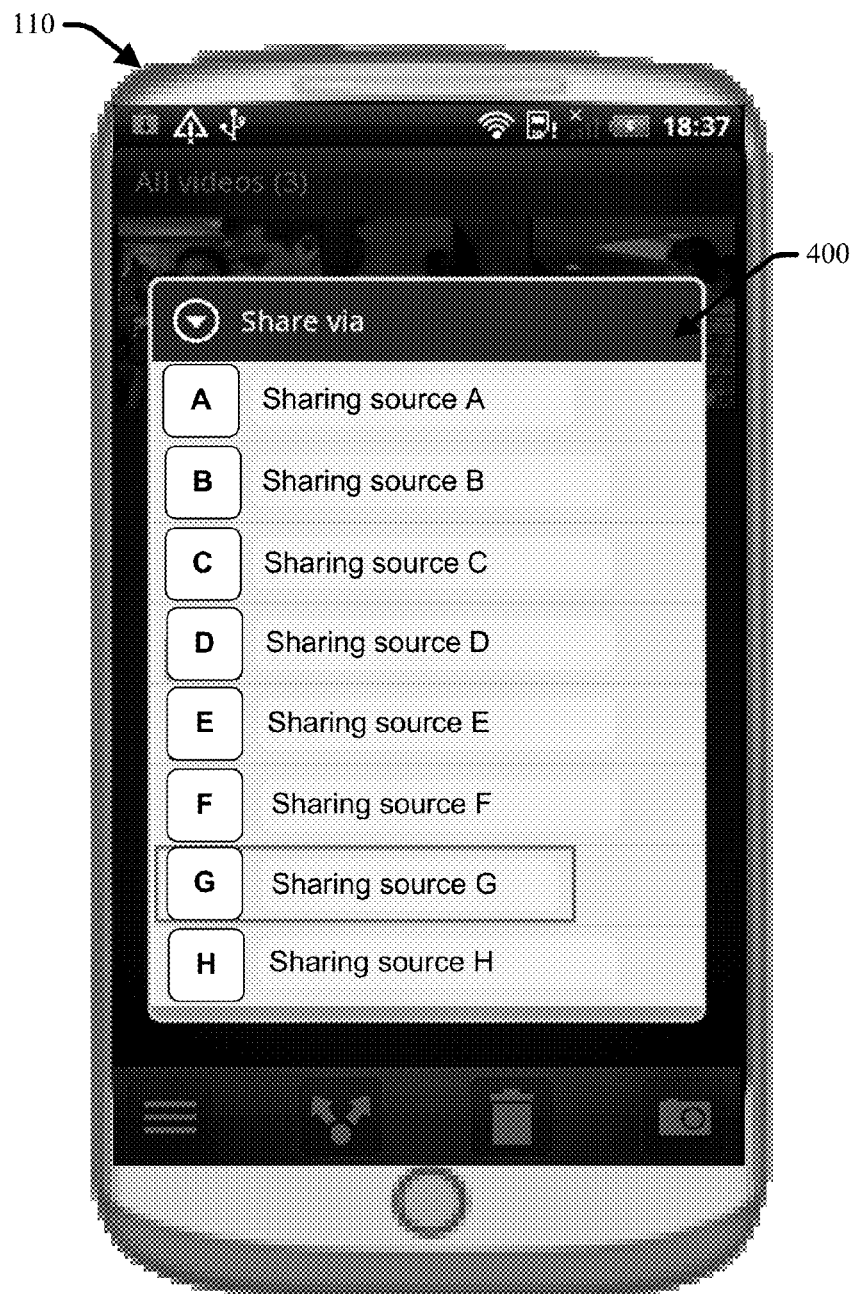
FIG. 4 presents a user interface including a sharing menu with sharing sources selected based in part on relation to referral sources, in accordance with various aspects and embodiments described herein.

For example, FIG. 4 presents an example user interface including a sharing menu 402 generated at an example client device 110 in accordance with aspects and embodiments described herein. In an aspect, sharing menu 400 was generated by sharing component 204 in response to a request to share a content item from content/service provider 102 to an external source. Sharing menu 400 includes a list of possible sharing sources A-H to which the user of client device 110 may select to share a URL to the content item. In an aspect, those sharing sources A-H that are included in the sharing menu 400 were selected by sharing component 204 based in part on frequency and recency with which they were characterized as referral sources at the client device 110 or in association with the user of client device.

Referring back to FIG. 3, inference component 308 is configured to provide for or aid in various inferences or determinations associated with aspects content/service provider application 302 and sharing platform 202. For example, inference component 308 can infer whether an external source is a referral source based on prior patterns associated with a user at client device 110 in addition to a tag included in the inbound URL that identifies a source to which the URL was originally shared. In another example, inference component 308 can infer which external sources to include in a sharing menu based in part on frequency and recency with which they are classified as referral sources.

In order to provide for or aid in the numerous inferences described herein, inference component 308 can examine the entirety or a subset of the data to which it is granted access and can provide for reasoning about or infer states of the system, environment, etc. from a set of observations as captured via events and/or data. An inference can be employed to identify a specific context or action, or can generate a probability distribution over states, for example. The inference can be probabilistic—that is, the computation of a probability distribution over states of interest based on a consideration of data and events. An inference can also refer to techniques employed for composing higher-level events from a set of events and/or data.

Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x3, x4, xn), to a confidence that the input belongs to a class, such as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

In view of the example systems and/or devices described herein, example methods that can be implemented in accordance with the disclosed subject matter can be further appreciated with reference to flowcharts in FIGS. 5-8. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 5:
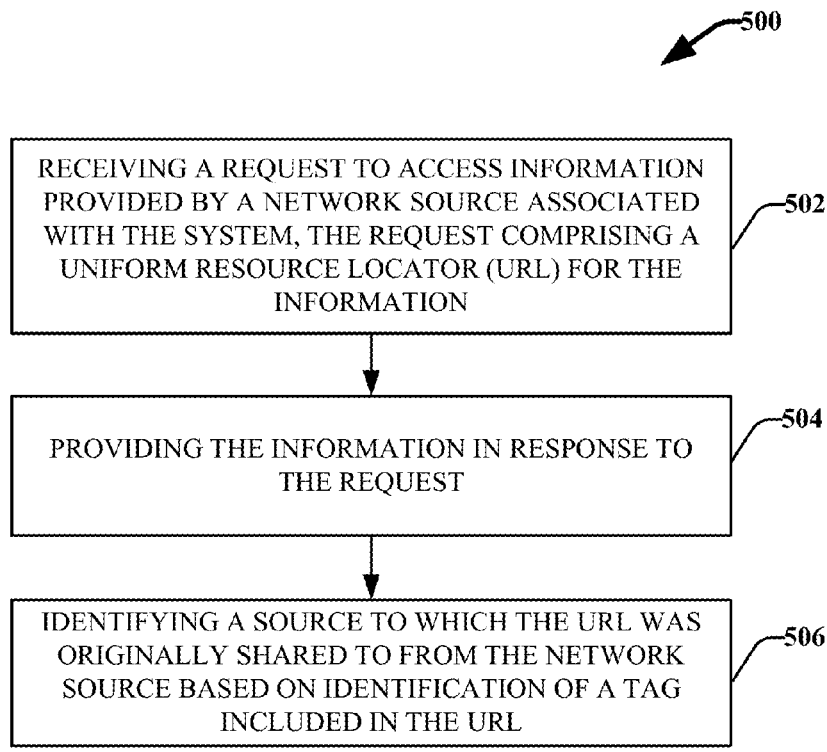
FIG. 5 is a flow diagram of an example method for identifying a source to which a URL was shared in accordance with various aspects and embodiments described herein.

FIG. 5 illustrates a flow chart of an example method 500 for identifying a source to which a URL was shared in accordance with aspects described herein. At 502, a request is received (e.g., at content/service provider application 112 via request component 114) to access information provided by a network source (e.g., content service provider 102) associated with a system (e.g., the content/service provider application 112). The request comprises a uniform resource locator (URL) for the information. For example, the system can include a native streaming media provider application located at a client device and the network source associated with the system can include an ASP or mobile application server configured to provide the streaming media to the client device via the native client application. According to this example, the request can include a request to open a URL for a media item provided by the streaming media provider using the native application in response to selection of the URL on the client device at an external source (e.g., another application, a website, a message received in at a messaging client provided at the device, etc.).

At 504, the information is provided in response to the request (e.g., by rendering component 116). For example, the native client application can open the URL associated with the request. At 506, a source to which the URL was originally shared to from the network source based on identification of a tag included in the URL (e.g., via source component 118). For example, where the tag includes an identifier for the source, the source to with the URL was shared can be determined directly based on the identifier. In another example, where the tag includes a unique token, the source can be indirectly identified based on extraction of the token and employing a look-up that relates the token to the source (e.g., provided at an external tag 104 database associated with the content/service provider 102).

Figure 6:
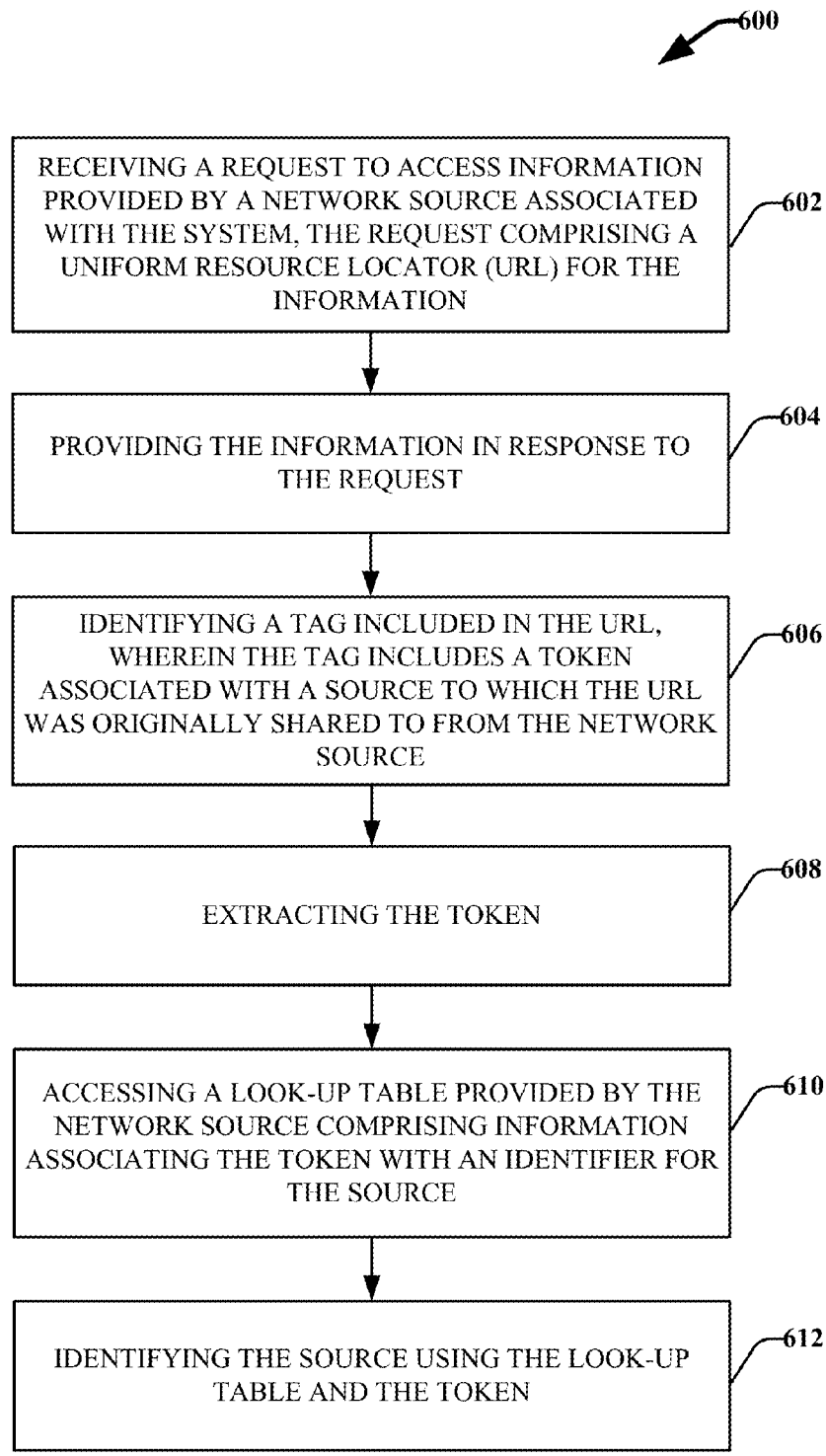
FIG. 6 is a flow diagram of another example method for identifying a source to which a URL was shared in accordance with various aspects and embodiments described herein.

FIG. 6 illustrates a flow chart of another example method 600 for identifying a source to which a URL was shared in accordance with aspects described herein. At 602, a request is received (e.g., at content/service provider application 112 via request component 114) to access information provided by a network source (e.g., content service provider 102) associated with the system (e.g., the content/service provider application 112), the request comprising a uniform resource locator (URL) for the information. At 604, the information is provided in response to the request (e.g., via rendering component 116). At 606, a tag included in the URL is identified (e.g., via source component 118). The tag includes a token associated with the source to which the URL was originally shared to from the network source. At 608, the token is extracted and at 610, a look-up table (e.g., tag database 104) is accessed (e.g., via source component 118). The look-up table includes information association the token with an identifier for the source. At 612, the source is identified (e.g., via source component 118) using the look-up table and the token.

Figure 7:
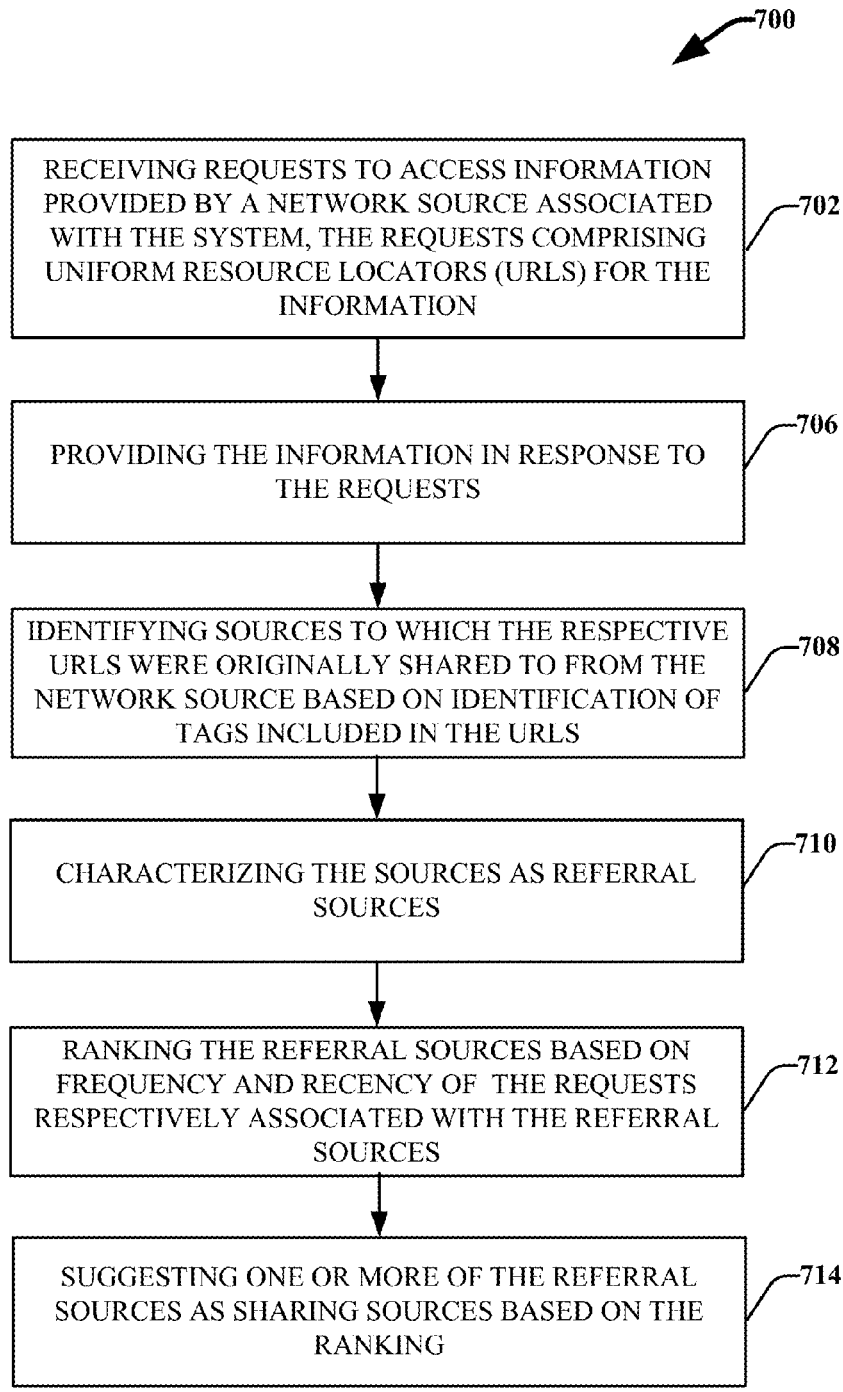
FIG. 7 is a flow diagram of an example method for identifying referral sources by a mobile application in accordance with various aspects and embodiments described herein.

FIG. 7 illustrates a flow chart of an example method 700 for identifying referral sources by a mobile application in accordance with aspects described herein. At 702, requests to access information provided by a network source (e.g., content service provider 102) associated with a system (e.g., content/service provider application 112) are received (e.g., by request component 114). The requests respectively include uniform resource locators (URLs) for the information. At 708, sources to which the respective URLs were originally shared to from the network source are identified based on identification of tags included in the URLs (e.g., via source component 118). At 710, the sources are characterized as referral sources (e.g., via referral component 304). At 712, the referral source are ranked based on frequency and recency of the requests respectively associated with the referral sources (e.g., via ranking component 306). At 714, one or more of the referral sources are suggested as sharing sources based on the ranking (e.g., via sharing component 204).

Figure 8:
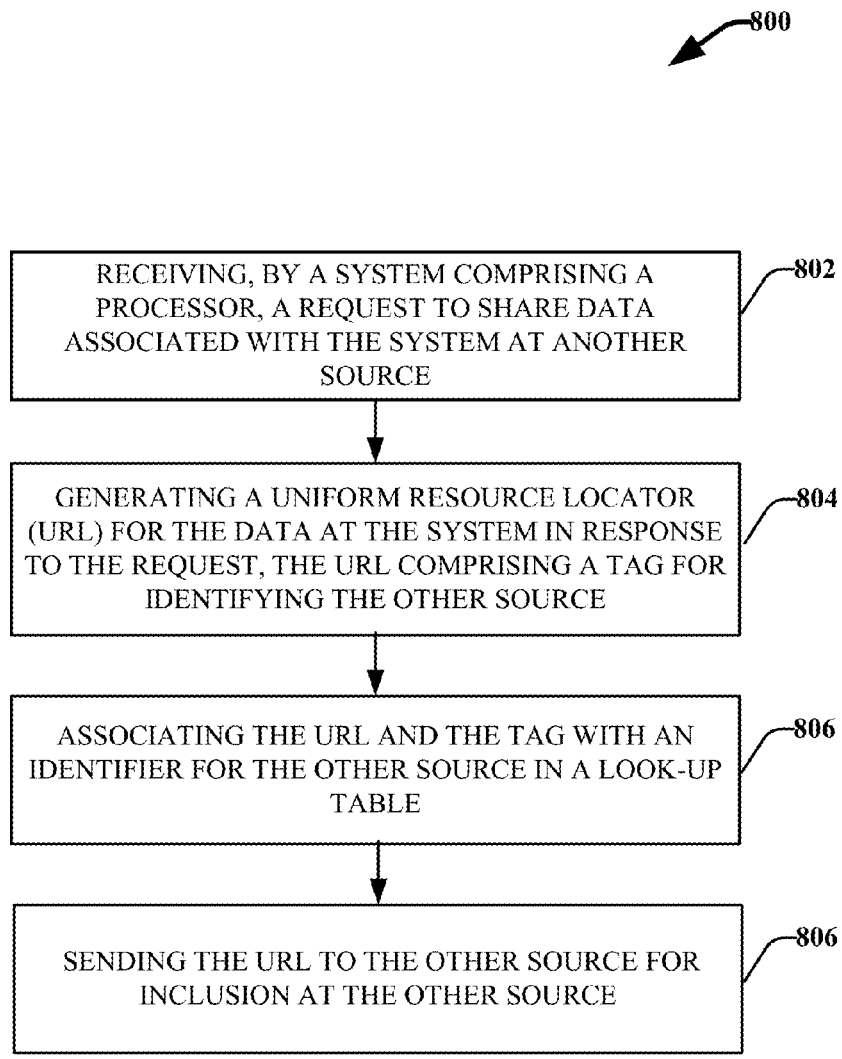
FIG. 8 is a flow diagram of another example method for associating a tag in a URL to facilitate identifying a source to which the URL was shared in accordance with various aspects and embodiments described herein.

FIG. 8 illustrates a flow chart of an example method 800 for associating a tag in a URL to facilitate identifying a source to which the URL was shared in accordance with aspects described herein. At 802, a request is received (e.g., via sharing component 204) by as system comprising a processor (e.g., sharing platform 202) to share data associated with the system at another source. At 804, a URL for the data is generated by the system in response to the request (e.g., via link generation component 206). In association with generating the URL, an a tag that identifies or that is attributable to the other source is generated and embedded or included in the URL. At 806, the URL, the tag, and an identifier for the source are associated with one another in a look-up table (e.g., tag database 104, via source component 208). Then at 808, the URL is send to the other source for inclusion at the other source (e.g., via posting component 210).

EXAMPLE OPERATING ENVIRONMENTS

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 9:
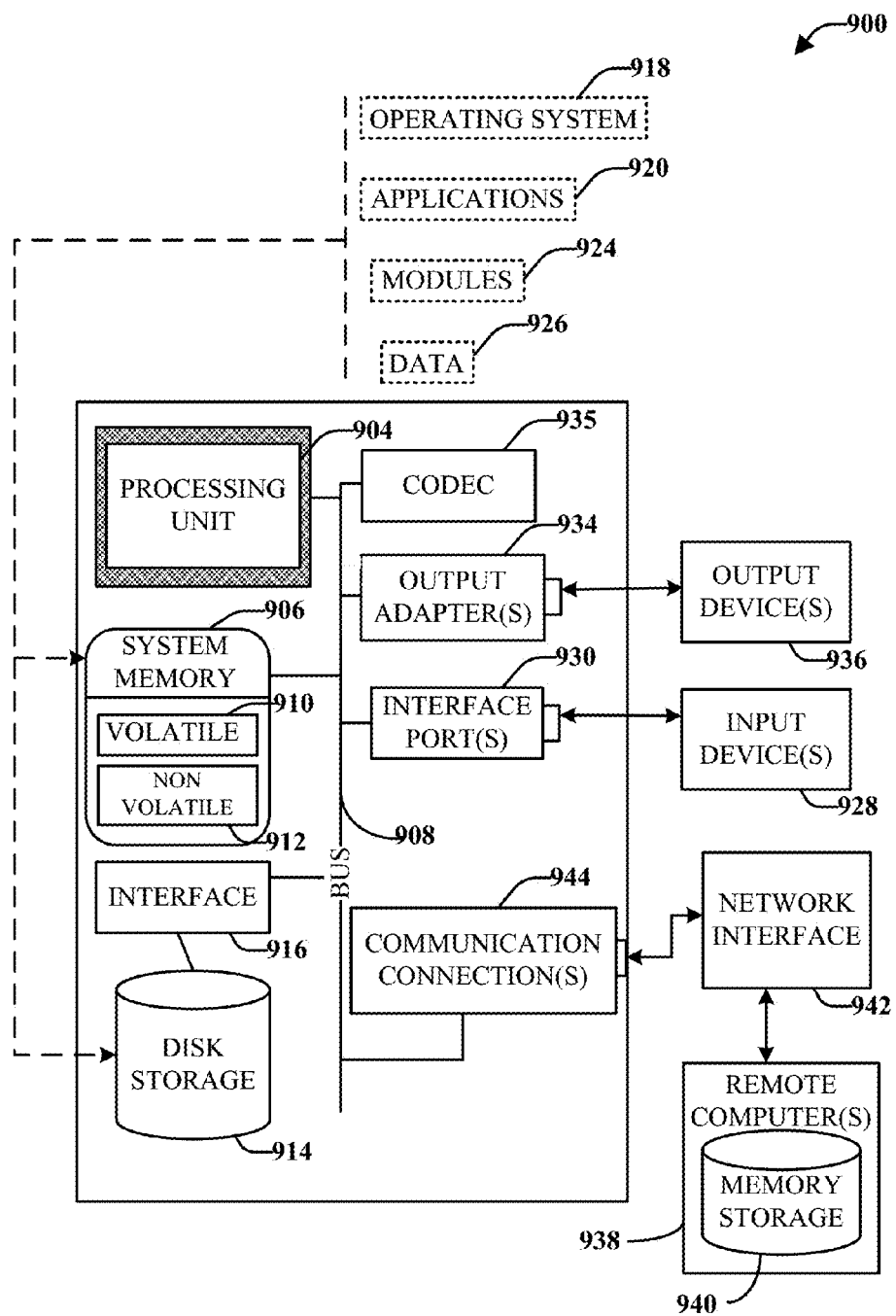
FIG. 9 is a schematic block diagram illustrating a suitable operating environment in accordance with various aspects and embodiments.

With reference to FIG. 9, a suitable environment 900 for implementing various aspects of the claimed subject matter includes a computer 902. The computer 902 includes a processing unit 904, a system memory 906, a codec 905, and a system bus 908. The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 906 includes volatile memory 910 and non-volatile memory 912. The basic input/output system (BIOS), containing the basic routines to transfer information between elements within the computer 902, such as during start-up, is stored in non-volatile memory 912. In addition, according to present innovations, codec 905 may include at least one of an encoder or decoder, wherein the at least one of an encoder or decoder may consist of hardware, a combination of hardware and software, or software. Although, codec 905 is depicted as a separate component, codec 905 may be contained within non-volatile memory 912. By way of illustration, and not limitation, non-volatile memory 912 can include read only memory (ROM), programmable ROM (PROM), electrically programmable ROM (EPROM), electrically erasable programmable ROM (EEPROM), or flash memory. Volatile memory 910 includes random access memory (RAM), which acts as external cache memory. According to present aspects, the volatile memory may store the write operation retry logic (not shown in FIG. 9) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 902 may also include removable/non-removable, volatile/non-volatile computer storage medium. FIG. 9 illustrates, for example, disk storage 914. Disk storage 914 includes, but is not limited to, devices like a magnetic disk drive, solid state disk (SSD) floppy disk drive, tape drive, Jaz drive, Zip drive, LS-70 drive, flash memory card, or memory stick. In addition, disk storage 914 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used, such as interface 916.

It is to be appreciated that FIG. 9 describes software that acts as an intermediary between users and the basic computer resources described in the suitable operating environment 900. Such software includes an operating system 918. Operating system 918, which can be stored on disk storage 914, acts to control and allocate resources of the computer system 902. Applications 920 take advantage of the management of resources by operating system 918 through program modules 924, and program data 926, such as the boot/shutdown transaction table and the like, stored either in system memory 906 or on disk storage 914. It is to be appreciated that the claimed subject matter can be implemented with various operating systems or combinations of operating systems.

A user enters commands or information into the computer 902 through input device(s) 928. Input devices 928 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s). Thus, for example, a USB port may be used to provide input to computer 902, and to output information from computer 902 to an output device 936. Output adapter 934 is provided to illustrate that there are some output devices 936 like monitors, speakers, and printers, among other output devices 936, which require special adapters. The output adapters 934 include, by way of illustration and not limitation, video and sound cards that provide a means of connection between the output device 936 and the system bus 908. It should be noted that other devices and/or systems of devices provide both input and output capabilities such as remote computer(s) 938.

Computer 902 can operate in a networked environment using logical connections to one or more remote computers, such as remote computer(s) 938. The remote computer(s) 938 can be a personal computer, a server, a router, a network PC, a workstation, a microprocessor based appliance, a peer device, a smart phone, a tablet, or other network node, and typically includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN)

and variations thereon, packet switching networks, and Digital Subscriber Lines (DSL).

Communication connection(s) 944 refers to the hardware/software employed to connect the network interface 942 to the bus 908. While communication connection 944 is shown for illustrative clarity inside computer 902, it can also be external to computer 902. The hardware/software necessary for connection to the network interface 942 includes, for exemplary purposes only, internal and external technologies such as, modems including regular telephone grade modems, cable modems and DSL modems, ISDN adapters, and wired and wireless Ethernet cards, hubs, and routers.

Figure 10:
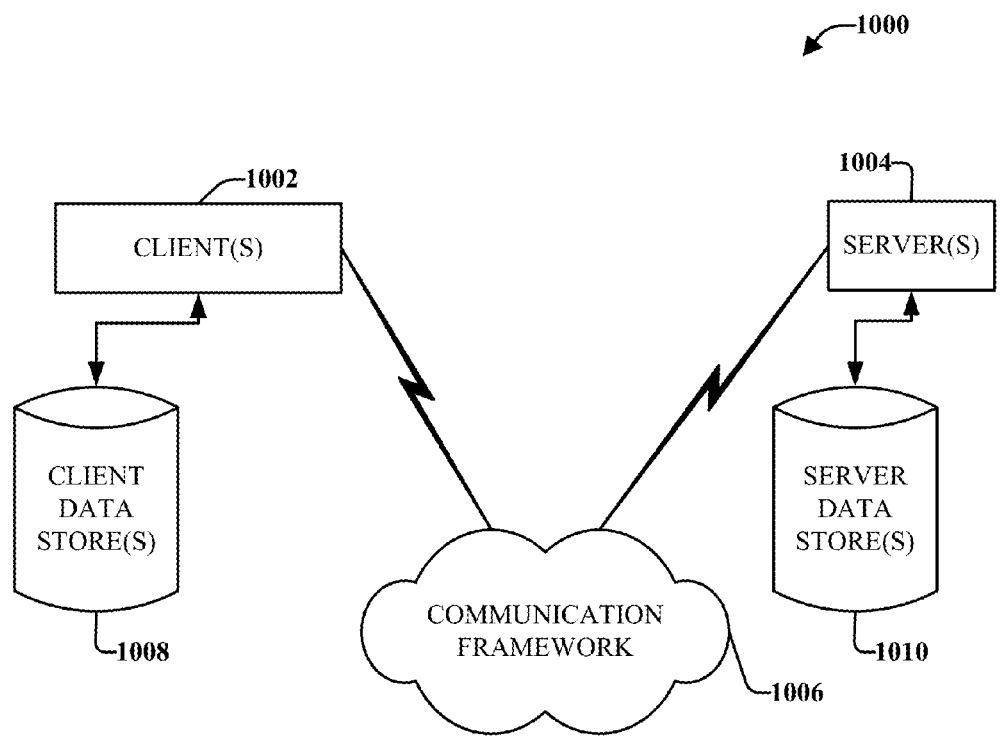
FIG. 10 is a schematic block diagram of a sample-computing environment in accordance with various aspects and embodiments.

Referring now to FIG. 10, there is illustrated a schematic block diagram of a computing environment 1000 in accordance with this disclosure. The system 1000 includes one or more client(s) 1002 (e.g., laptops, smart phones, PDAs, media players, computers, portable electronic devices, tablets, and the like). The client(s) 1002 can be hardware and/or software (e.g., threads, processes, computing devices). The system 1000 also includes one or more server(s) 1004. The server(s) 1004 can also be hardware or hardware in combination with software (e.g., threads, processes, computing devices). The servers 1004 can house threads to perform transformations by employing aspects of this disclosure, for example. One possible communication between a client 1002 and a server 1004 can be in the form of a data packet transmitted between two or more computer processes wherein the data packet may include video data. The data packet can include a metadata, e.g., associated contextual information, for example. The system 1000 includes a communication framework 1006 (e.g., a global communication network such as the Internet, or mobile network(s)) that can be employed to facilitate communications between the client(s) 1002 and the server(s) 1004.

Communications can be facilitated via a wired (including optical fiber) and/or wireless technology. The client(s) 1002 include or are operatively connected to one or more client data store(s) 1008 that can be employed to store information local to the client(s) 1002 (e.g., associated contextual information). Similarly, the server(s) 1004 are operatively include or are operatively connected to one or more server data store(s) 1010 that can be employed to store information local to the servers 1004.

In one embodiment, a client 1002 can transfer an encoded file, in accordance with the disclosed subject matter, to server 1004. Server 1004 can store the file, decode the file, or transmit the file to another client 1002. It is to be appreciated, that a client 1002 can also transfer uncompressed file to a server 1004 and server 1004 can compress the file in accordance with the disclosed subject matter. Likewise, server 1004 can encode video information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:
1. A system, comprising:
a memory that stores computer executable instructions; and
at least one processor that executes the computer executable instructions stored in the memory which cause the at least one processor to:
receive a request to share a video to a social network service from a first client device, wherein access to the video is provided by a network source associated with the system;
in response to the request to share the video to the social network service from the first client device, generate a first uniform resource locator (URL) that provides access to the video, wherein at least a portion of the first URL includes information indicating that the first URL was used to share the video to the social network service;
receive, from a second client device, a request to access the video, the request comprising the first URL;
redirect the second client device to a URL associated with the video, wherein the URL associated with the video is different than the first URL;
determine that the first URL was previously shared to the social network service based on at least the portion of the first URL;
send the video to the second client device based on the redirected request received at the URL associated with the video;
receive a request to share the video to the social network service from the second client device;
in response to the request to share the video to the social network service from the second client device, generate a second URL that provides access to the video, wherein at least a portion of the second URL includes information indicating that the second URL was used to share the video to the social network service;

receive, from a third client device, a request to access the video, the request comprising the second URL;

redirect the third client device to the URL associated with the video;

determine that the second URL was previously shared to the social network service based on at least the portion of the second URL; and send the video to the third client device based on the redirected request received at the URL associated with the video.

2. The system of claim 1, wherein the portion of the first URL comprises a tag that includes identifying information for the social network service at which the URL was provided and selected to initiate the request.

3. The system of claim 1, wherein the portion of the first URL comprises a tag that includes identifying information for the social network service to which the URL was originally shared to from the network source.

4. The system of claim 1, wherein the portion of the first URL comprises a tag that includes a token that is associated with an identifier for a source to which the URL was originally shared to from the network source, wherein the at least one processor executes the computer executable instructions stored in the memory which further cause the at least one processor to identify the token, extract the token, and employ the token to determine the source to which the first URL was originally shared to from the network source.

5. The system of claim 4, wherein the token corresponds to the portion of the first URL.

6. The system of claim 4, wherein the at least one processor executes the computer executable instructions stored in the memory which further cause the at least one processor to access a look-up table that associates the token with the identifier to determine the source to which the URL was originally shared to from the network source.

7. The system of claim 6 wherein the look-up table is provided in a database associated with the network source and accessible to the system via a network.

8. The system of claim 1, wherein the at least one processor executes the computer executable instructions stored in the memory which further cause the at least one processor to:

associate the social network service with a user associated with the first client device; and suggest one or more sharing sources for the user to share a second video provided by the network source based on the social network service.

9. The system of claim 8, wherein the at least one processor executes the computer executable instructions stored in the memory which further cause the at least one processor to suggest the social network service as a sharing source for the user to share the second video.

10. The system of claim 8, wherein the at least one processor executes the computer executable instructions stored in the memory which further cause the at least one processor to:

rank potential sharing sources based on referral sources from which requests, associated with the user to access videos provided by the network source are received; and select the one or more sharing sources from the potential sharing sources based on the ranking.

11. The system of claim 10, wherein the at least one processor executes the computer executable instructions stored in the memory which further cause the at least one processor to rank the potential sharing sources based on frequency of the requests respectively originating from the potential sharing sources.

12. A method comprising:

receiving, by a system comprising at least one hardware processor, a request to share a video to a social network service from a first client device, wherein access to the video is provided by a network source associated with the system;

in response to the request to share the video to the social network service from the first client device, generating a first uniform resource locator (URL) that provides access to the video, wherein at least a portion of the first URL includes information indicating that the first URL was used to share the video to the social network service;

receiving, from a second client device, a request to access the video, the request comprising the first URL;

redirecting the second client device to a URL associated with the video, wherein the URL associated with the video is different than the first URL;

determining that the first URL was previously shared to the social network service based on at least the portion of the first URL;

sending the video to the second client device based on the redirected request received at the URL associated with the video;

receiving a request to share the video to the social network service from the second client device;

in response to the request to share the video to the social network service from the second client device, generate a second URL that provides access to the video, wherein at least a portion of the second URL includes information indicating that the second URL was used to share the video to the social network service;

receiving, from a third client device, a request to access the video, the request comprising the second URL;

redirecting the third client device to the URL associated with the video;

determining that the second URL was previously shared to the social network service based on at least the portion of the second URL; and sending the video to the third client device based on the redirected request received at the URL associated with the video.

13. The method of claim 12, wherein the portion of the first URL comprises a tag that includes identifying information for the social network service at which the URL was provided and selected to initiate the request.

14. The method of claim 12, wherein the portion of the first URL comprises a tag that includes a token that is associated with an identifier for a source to which the URL was originally shared to from the network source, wherein the identifying comprises:

identifying the token;

extracting the token; and employing the token to determine the source based on the identifier.

15. The method of claim 14, wherein the employing the token comprises:

accessing a look-up table provided by the network source that associates the token with the identifier to determine that the social network service is the source, wherein the network source generated the token and associated the token with the URL in response to sharing of the URL from the network source to the source, and wherein the network source associated the token with the URL and the identifier for source in the look-up table in response to the sharing of the URL from the network source to the source.

16. A non-transitory computer-readable medium containing computer executable instructions that, when executed by a processor, cause the processor to perform a method, the method comprising:

receiving a request to share a video to a social network service from a first client device, wherein access to the video is provided by a network source;

in response to the request to share the video to the social network service from the first client device, generating a first uniform resource locator (URL) that provides access to the video, wherein at least a portion of the first URL includes information indicating that the first URL was used to share the video to the social network service;

receiving, from a second client device, a request to access the video, the request comprising the first URL;

redirecting the second client device to a URL associated with the video, wherein the URL associated with the video is different than the first URL;

determining that the first URL was previously shared to the social network service based on at least the portion of the first URL;

sending the video to the second client device based on the redirected request received at the URL associated with the video;

receiving a request to share the video to the social network service from the second client device;

in response to the request to share the video to the social network service from the second client device, generate a second URL that provides access to the video, wherein at least a portion of the second URL includes information indicating that the second URL was used to share the video to the social network service;

receiving, from a third client device, a request to access the video, the request comprising the second URL;

redirecting the third client device to the URL associated with the video;

determining that the second URL was previously shared to the social network service based on at least the portion of the second URL; and sending the video to the third client device based on the redirected request received at the URL associated with the video.

* * * * *